May 5, 1964 K. K. MAASS 3,132,263
PULSE TIME SELECTOR WITH MINIMUM DELAY TIME
Filed Dec. 20, 1961

KLAUS K. MAASS
INVENTOR
BY Richard D. Stapler
ATTORNEY

United States Patent Office 3,132,263
Patented May 5, 1964

3,132,263

PULSE TIME SELECTOR WITH MINIMUM DELAY TIME

Klaus Karl Maass, Binghamton, N.Y., assignor to General Precision, Inc., Binghamton, N.Y., a corporation of Delaware Filed Dec. 20, 1961, Ser. No. 160,793
1 Claim. (Cl. 307—88.5)

This invention relates to electronic pulse circuits, and more particularly, to a simple and efficient circuit adapted to receive trains of pulses and eliminate pulses having less than a given width (or area) without significantly delaying pulse trailing edges. For example, in character recognition apparatus it is usually desired to maintain, even in the presence of noise signals, an accurate time relationship or synchronization between scanning-derived pulse trailing edges and basic machine clock or timing cycles. The invention is of particular value for use in connection with systems, such as character recognition machines, which utilize scanning devices to produce pulse trains having pulses of very many different widths. The presence of smudges, fuzzy edges and various other printing defects causes most scanning devices to produce narrow spike pulses, which sometimes are erroneously confused with the usual wider information pulses which result as the scanner crosses a portion of a character.

The problem of filtering out noise spikes and other narrow width pulses has been solved in many prior art devices by RC time integration by a low-pass filter of each input pulse to provide input switching potentials for a single-shot multivibrator or other pulse re-shaping device. If a given input pulse is of insufficient area, it does not charge up the integrator capacitor to the predetermined level necessary to trigger the multivibrator. Because the RC network of the prior art arrangement integrates all information pulses as well as the narrow noise spikes, the sharp trailing edge of each information pulse will be obscured; so that pulse width becomes obscure. In very many pulse circuit applications it is essential or highly desirable that any reformed or re-shaped pulse train preserve the sharp trailing edges of the pulses, preferably without delaying them. Previous methods of eliminating noise pulses (without delaying pulse trailing edges) have required many more components than the present invention, resulting in much greater expense and poorer reliability. The requirement for preserving a sharp and undelayed pulse trailing edge pertains to many digital computers and other digital data-handling devices as well as with character recognition machinery. Having a pulse trailing edge signal available as soon as it occurs enables one to decrease computation or switching time in many devices, and having a trailing edge signal which is sharp and distinct enables one to eliminate amplifiers or triggers which one might be required to use with conventional, slowly-varying trailing edge signals.

Thus it is a primary object of the invention to provide an improved pulse circuit which will filter out narrow "noise" pulses without delaying or obscuring the trailing edges of data pulses transmitted through the circuit.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claim.

For a fuller understanding of the nature and object of the invention reference should be had to the following detailed description taken in connection with the accompanying drawing, in which.

Figure 1:
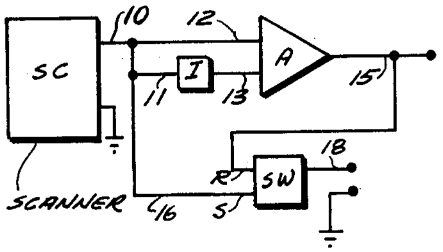
FIG. 1 is a symbolic electrical diagram showing the invention in generalized form.

Referring to FIG. 1, it may be assumed that an input signal from a scanning device SC, such as a photoelectric or magnetic reading device, for example, is applied via line 10, through a buffer circuit (not shown) if desired, so as not to load the scanner too heavily. The input signals on line 10 are applied to line 11 and via integrating device I to provide one input signal to coincidence, or "AND" gate A, and also applied directly to gate A via line 12. The time constant of integrator I is easily chosen with respect to the operating level of gate A so that noise or spurious pulses caused by scanning at the selected machine speed of smudges or specks do not provide a large enough signal on line 13 to operate coincidence gate A, but so that the wider, and sometimes higher, information pulses which result from scanning actual character lines will provide a signal on line 13 sufficient to operate gate A at those times when the signal on the other input line 12 to gate A is also at operating level.

When a given input signal is applied to line 10, there will not immediately by any output from gate A, but only a short time later, and only then if the given input signal has sufficient area (amplitude and time duration) for integrator I to raise line 13 to its predetermined operating level. Narrow noise pulses and spikes which result from scanning smudged areas and specks never will raise line 13 sufficiently to operate gate A, and hence noise pulses and spikes will not appear at output line 15 of gate A. If an information signal, i.e., a longer duration signal, which will result from scanning a clear character portion is applied to input line 10, it, after a delay time determined by the integrator I time constant, will cause line 13 to be raised to its gate-operating level. If, after such delay time, there continues to be a signal on line 10, both inputs of gate A will be operated and an output will appear at line 15. The output will remain on line 15, of course, as long as lines 12 and 13 remain at operating level. Because integrator I requires some time to discharge, line 13 may remain at its gate-operating level for some time after the duration of an applied pulse on line 10. Because delay is inherent in raising the output level of any integrator, it will be seen that the leading edge of any pulse signal on line 10 will not provide an output from gate A until sometime after the signal is applied to line 10. Thus the circuit shown in FIG. 1 delays, and may obscure, the leading edge of a signal applied to the circuit. Even though the leading edge of an information pulse is delayed by the circuit, the output on line 15 will disappear immediately upon occurrence of the applied pulse trailing edge, since line 12 disables or shuts off gate A immediately upon occurrence of the trailing edge. Thus the circuit does not in any way obscure or delay applied signal trailing edges, even though it integrates the applied signals to filter out spurious spikes and noise pulses.

Figure 3:
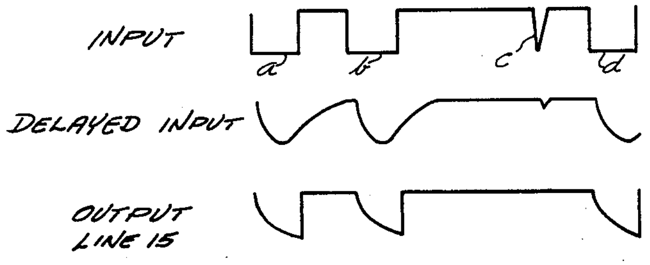
FIG. 3 is a series of waveform diagrams useful in understanding the operation of the invention.

In FIG. 3 the upper waveform illustrates an applied input signal on line 10 consisting of first and second spaced information pulses *a* and *b*, respectively, followed by noise spike *c* and then further information pulse *d*. The delayed input waveform in FIG. 3 illustrates the nature of the signal on line 13 which such an input on line 10 would cause, and the lower waveform illustrates the nature of the output signal which would be obtained from coincidence gate A.

In many pulse circuit applications it is desired to measure pulse width, by noting both the leading and trailing edges of a pulse, in order to operate a switching device during, and only during, the time interval between the leading and trailing edges. If the applied input signal is connected directly as shown via line 16 as the "set" input to a switching device SW, such as a common Eccles-Jordan flip-flop, for example, the leading edge of an applied information pulse will immediately switch the state of the flip-flop as soon as the leading edge occurs, and if line 15 is connected to the "reset" line of the flip-flop, the trailing edge of the pulse will reset the flip-flop as soon as the trailing edge occurs, so that an output taken from the flip-flop on line 18 will be an accurate measure of the information pulse duration.

It may be noted that occurrence of a noise spike before the information pulse leading edge can switch flip-flop SW too soon, so that the output from flip-flop SW might erroneously indicate a greater information pulse than it should, but the occurrence of a noise spike at any time during the time information pulse interval will not shorten the indicated scanned line width pulse on line 18, and more importantly, random noise spikes which occur long before or after an information pulse will not affect accurate indication of the pulse trailing edge, and the indication of information pulse trailing edges will maintain an accurate time relationship, or synchronization with the machine clock cycle. If the present invention is adapted to handle character scanning information, a scanned character having two opposite fuzzy edges bounding a heavy "black" portion may provide an output signal in which the leading edge is inaccurately indicated too early, but the trailing edge will be indicated at precisely the proper moment in relation to the machine clock cycle, and specks or smudges displaced from the "black" portion of the character will be filtered out.

Figure 2:
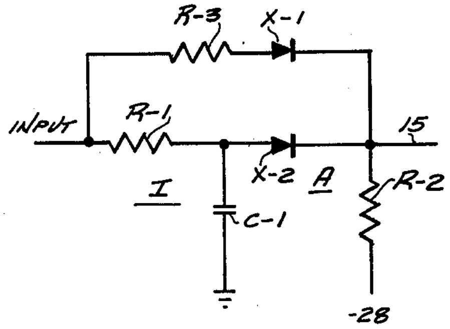
FIG. 2 is an electrical schematic diagram of one embodiment of the invention.

FIG. 2 shows in detail an illustrative, extremely simple embodiment of a portion of the invention, and corresponding portions to FIG. 1 are numbered similarly. Integrator I of FIG. 1 is shown in FIG. 2 as comprising a simple and well-known RC low-pass filter comprising resistor R–1 and capacitor C–1, either or both of which may be made adjustable if desired to determine the integrator time constant and hence the pulse width necessary to provide an output. Coincidence, or "AND" gate A is shown in FIG. 2 as comprising a conventional diode AND gate including diodes X–1, X–2 and resistor R–2, the latter being connected to a biasing potential shown as —28 volts, but which also may be made variable, if desired, to determine the pulse width necessary to provide an output. If diodes X–1 and X–2 are identical, input lines 12 and 13 of gate A have, in effect, different signal operating conditions due to the attenuation caused by resistor R–1 of integrator 1. By use of diodes which differ, or preferably by insertion of scaling resistor R–3 in series with line 12, the effective operating levels of lines 12 and 13 may be made as near equal or as different as desired. The above explanation of operation of the invention assumes that the operation of the AND gates per se is instantaneous, which is practically true in comparison to the integrator time constant, even though diodes X–1 and X–2 and the connections associated therewith inherently have small amounts of capacitance.

While the circuit of FIG. 1 is adapted to receive negative-going input signals, and gate A is therefore a so-called "negative AND gate," it is within the scope of the invention, of course, to handle positive-going input signals by using a "positive AND gate." Gate A may be converted into a positive AND gate simply by reversing the polarities of diodes X–1 and X–2 and the polarity of the biasing signal applied to resistor R–2. Various other known forms of AND gate may be substituted, and low-pass filter or integrator 1 may assume various other known forms, some of which, for example, may use series inductive elements.

It will thus be seen that the objects set forth above, among those made apparent from the preceding description, are efficiently attained. Since certain changes may be made in carrying out the above process in the described product and in the constructions set forth without departing from the scope of the invention, it is intended that all matter contained in the above description (or shown in the accompanying drawing) shall be interpreted as illustrative and not in a limiting sense.

Having described my invention, what I claim as new and desire to secure by Letters Patent is:

An electrical circuit for receiving a pulse train and effective to eliminate pulses having less than a predetermined time duration without significantly delaying the trailing edges of desired pulses, said circuit comprising, (*a*) an input line for receiving said pulse train;

(*b*) a coincidence gate having first and second input terminals and an output terminal;

(*c*) an electrical integrator having an input terminal, an output terminal, and a predetermined time constant for providing an effective signal at said output terminal only when a pulse signal applied to said input terminal exceeds said predetermined time duration;

(*d*) a bistable electrical circuit having set and reset input terminals and an output terminal energized by the application of a signal to said set terminal and deenergized by the application of a signal to said reset terminal;

(*e*) first circuit means connecting said input line to said first input terminal of said coincidence gate, to said input terminal of said integrator, and said set input terminal of said bistable circuit;

(*f*) second circuit means connecting said output terminal of said integrator to said second input terminal of said coincidence gate whereby said gate provides an output signal only when a pulse signal of said pulse train exceeds said predetermined time duration, said output signal terminating simultaneously with the termination of said pulse signal;

(*g*) third circuit means connecting said output terminal of said coincidence gate to said reset terminal of said bistable circuit; and (*h*) the output terminal of said bistable circuit, therefore, being energized by the leading edge of a pulse signal of said pulse train and deenergized by the trailing edge of said pulse when said pulse exceeds said predetermined time duration.

References Cited in the file of this patent

UNITED STATES PATENTS

| | | |
|---|---|---|
| 2,568,265 | Olvarez | Sept. 18, 1951 |
| 2,975,366 | Young | Mar. 14, 1961 |
| 3,007,060 | Guenther | Oct. 31, 1961 |
| 3,032,714 | Cohen | May 1, 1962 |
| 3,036,272 | Le Vezu | May 22, 1962 |

OTHER REFERENCES

"Pulse and Digital Circuits," by Millman and Taub, McGraw-Hill Book Co., 1956 (page 398 relied upon).